United States Patent
Miyoshi (10) Patent No.: US 11,577,547 B2
(45) Date of Patent: Feb. 14, 2023

(54) PNEUMATIC TIRE AND METHOD OF MANUFACTURING SAME

(71) Applicant: The Yokohama Rubber Co., LTD., Tokyo (JP)

(72) Inventor: Masaaki Miyoshi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/606,713

(22) PCT Filed: Apr. 5, 2018

(86) PCT No.: PCT/JP2018/014607
§ 371 (c)(1),
(2) Date: Oct. 18, 2019

(87) PCT Pub. No.: WO2018/193865
PCT Pub. Date: Oct. 25, 2018

(65) Prior Publication Data
US 2020/0062036 A1    Feb. 27, 2020

(30) Foreign Application Priority Data
Apr. 19, 2017  (JP) .............................. JP2017-082741

(51) Int. Cl.
*B29D 30/30* (2006.01)
*B60C 9/18* (2006.01)
(Continued)

(52) U.S. Cl.
CPC ................ *B60C 5/14* (2013.01); *B29D 30/30* (2013.01); *B60C 9/08* (2013.01); *B60C 2009/145* (2013.01); *B60C 2009/1842* (2013.01)

(58) Field of Classification Search
CPC ............ B60C 2009/145; B60C 9/1835; B60C 5/14; B60C 9/14; B60C 9/185
(Continued)

(56) References Cited

U.S. PATENT DOCUMENTS 6,619,354 B1 * 9/2003 Kobayashi ................ B60C 9/08
152/517
2004/0112496 A1 * 6/2004 Domenico Colantonio ................
B60C 1/0008
152/510
(Continued)

FOREIGN PATENT DOCUMENTS

DE    102008038764 A1 *  2/2010 ............ B60C 5/142
JP    H04-176705           6/1992
(Continued)

OTHER PUBLICATIONS

ESpaceNet Translation of JP2015174594A (Year: 2020).*
ESpaceNet Translation of DE102008038764A1 (Year: 2020).*
ESpaceNet Translation JP5239507B2 (Year: 2020).*
ESpaceNet Translation of JPH04176705A (Year: 2020).*
(Continued)

*Primary Examiner* — Robert C Dye
*Assistant Examiner* — Alexander D Booth
(74) *Attorney, Agent, or Firm* — Thorpe North & Western (57) ABSTRACT

In a pneumatic tire, a partial tie rubber layer is disposed between a carcass layer and an innerliner layer in a limited manner across an entire region excluding end portions near a pair of bead portions; end surfaces on both sides in a tire lateral direction of the partial tie rubber layer are inclined surfaces that form an acute angle with respect to a surface of the partial tie rubber layer on the carcass layer side; and an inclination angle of the inclined surfaces with respect to the surface of the partial tie rubber layer on the carcass layer side is from 20° to 60°.

4 Claims, 4 Drawing Sheets

(51) Int. Cl.
*B60C 9/14* (2006.01)
*B60C 5/14* (2006.01)
*B60C 9/08* (2006.01)

(58) Field of Classification Search
USPC .......................................................... 152/502
See application file for complete search history.

(56) References Cited

U.S. PATENT DOCUMENTS

| | | | |
|---|---|---|---|
| 2006/0042740 A1* | 3/2006 | Takahashi | B60C 1/0008 |
| | | | 152/510 |
| 2006/0144495 A1* | 7/2006 | Higuchi | B60C 9/12 |
| | | | 152/458 |
| 2010/0181000 A1 | 7/2010 | Takahashi | |
| 2011/0139328 A1* | 6/2011 | Pierangelo | B29D 30/3028 |
| | | | 152/537 |
| 2011/0186201 A1* | 8/2011 | Buxton | B60C 15/0632 |
| | | | 152/541 |
| 2016/0068031 A1* | 3/2016 | Kaszas | C08L 23/0876 |
| | | | 152/504 |
| 2018/0222253 A1 | 8/2018 | Suzuki | |
| 2019/0054768 A1 | 2/2019 | Akashi | |

FOREIGN PATENT DOCUMENTS

| | | |
|---|---|---|
| JP | H11-005261 | 1/1999 |
| JP | 2010-167829 | 8/2010 |
| JP | 5239507 | 7/2013 |
| JP | 5723 086 | 5/2015 |
| JP | 2015-174594 | 10/2015 |
| WO | WO 2005/007423 | 1/2005 |
| WO | WO 2017/022837 | 2/2017 |
| WO | WO 2017/145982 | 8/2017 |

OTHER PUBLICATIONS

International Search Report for International Application No. PCT/JP2018/014607 dated Jul. 10, 2018, 3 pages, Japan.

* cited by examiner

PNEUMATIC TIRE AND METHOD OF MANUFACTURING SAME

TECHNICAL FIELD

The present technology relates to a pneumatic tire provided with a partial tie rubber layer disposed in a limited manner at a portion between a carcass layer and an innerliner layer and a method of manufacturing the same, and particularly relates to a pneumatic tire and a method of manufacturing the same that can prevent vulcanization defects, which are a concern when employing a partial tie rubber layer, and can sufficiently achieve reduced tire weight and rolling resistance due to employing a partial tie rubber layer.

BACKGROUND ART

Typically, in pneumatic tires, a tie rubber layer is disposed between a carcass layer and an innerliner layer to prevent carcass cords from digging into the innerliner layer when the unvulcanized tire is inflated during the tire manufacturing process. In recent years, to reduce tire weight and rolling resistance, tie rubber layers which are partial tie rubber layers selectively disposed at left and right shoulder regions instead of across the entire region between a carcass layer and an innerliner layer have been proposed (see Japan Patent Nos. 5239507 and 5723086, for example).

With such a partial tie rubber layer, the used amount of the tie rubber layer can be reduced compared to conventional tie rubber layers (full tie rubber layers) disposed across the entire region between layers the carcass layer and the innerliner layer, and tire weight and rolling resistance can be reduced. However, partial tie rubber layers disposed at shoulder regions each include a pair of end portions (an end portion on the tire equator side and an end portion located outward in the tire lateral direction), and many of these end portions may be where tire components begin separating from each other or correspond to portions that fail to bond together during manufacture. This affects the manufacturability of the tire.

Considering the issue of the number of ends described above, instead, the used amount of the tie rubber layer may be reduced by simply narrowing the width of a conventional full tie rubber layer. However in this case as well, the end portions of the tie rubber layer may be where separation begins and correspond to portions that fail to bond together. Accordingly, there is a demand for further enhancement in the prevention of vulcanization defects such as air pockets via adjustments to the structure and/or arrangement of the tie rubber layer to achieve a reduction in the used amount of tie rubber layer and a reduction in the tire weight as well as providing favorable air permeation preventive properties and steering stability.

SUMMARY

The present technology provides a pneumatic tire and a method of manufacturing the same that can prevent vulcanization defects, which are a concern when employing a partial tie rubber layer with a shape disposed in a limited manner at a portion between a carcass layer and an innerliner layer, and can sufficiently achieve reduced tire weight and rolling resistance due to employing a partial tie rubber layer.

A pneumatic tire according to an embodiment of the present technology comprises:

an annular tread portion extending in a tire circumferential direction;

a pair of sidewall portions disposed on both sides of the tread portion;

a pair of bead portions disposed inward of the pair of sidewall portions in a tire radial direction;

a carcass layer mounted between the pair of bead portions;

a belt layer disposed radially outward of the carcass layer in the tread portion;

an innerliner layer disposed on a tire inner surface along the carcass layer; and a partial tie rubber layer disposed between the carcass layer and the innerliner layer across an entire region excluding end portions near the pair of bead portions; wherein end surfaces of the partial tie rubber layer on both sides in a tire lateral direction are inclined surfaces that form an acute angle with respect to a surface of the partial tie rubber layer on the carcass layer side; and an inclination angle of the inclined surfaces with respect to the surface of the partial tie rubber layer on the carcass layer side is from 20° to 60°.

A method of manufacturing a pneumatic tire according to an embodiment of the present technology comprises:

placing an unvulcanized partial tie rubber layer across an entire region of an unvulcanized innerliner layer or a carcass layer corresponding to a region of a vulcanized pneumatic tire excluding end portions near a pair of bead portions;

layering the unvulcanized carcass layer on the unvulcanized innerliner layer with the unvulcanized partial tie rubber layer therebetween and forming a green tire; and vulcanizing the green tire with a bladder pressing against an inner side of the green tire; wherein an inclined surface that forms an acute angle with respect to a first surface of the unvulcanized partial tie rubber layer is formed on each lateral end portion of the unvulcanized partial tie rubber layer;

an inclination angle of the inclined surface with respect to the first surface is from 20° to 60°; and the unvulcanized partial tie rubber layer is layered between the unvulcanized innerliner layer and the unvulcanized carcass layer with the first surface orientated facing the unvulcanized carcass layer.

In a pneumatic tire according to an embodiment of the present technology, a partial tie rubber layer is employed to achieve reduced tire weight and rolling resistance compared to conventional pneumatic tires including a full tie rubber layer. In this configuration, end portions of the partial tie rubber layer are formed with an inclined surface having a specific angle as described above. This can suppress the formation of a potential air-pocket-causing level difference or a gap between the innerliner layer and the carcass layer and the end portion of the partial tie rubber layer when the tire components are layered in the tire manufacturing process. Thus, vulcanization defects can be prevented.

In a method of manufacturing a pneumatic tire according to an embodiment of the present technology, end portions of the unvulcanized partial tie rubber layer are formed with an inclined surface having a specific angle as described above and the orientation of the partial tie rubber layer when layered is specified. This can suppress the formation of a potential air-pocket-causing level difference or a gap between the innerliner layer and the carcass layer and the end portion of the partial tie rubber layer when the tire components are pressed by the bladder in the tire manufacturing process. Thus, vulcanization defects can be prevented.

In the present technology, preferably a hardness of a rubber constituting the partial tie rubber layer is from 50 to 70. Setting the hardness of the partial tie rubber layer in this manner allows the shape of the partial tie rubber layer to be favorably maintained, which is advantageous in enhancing the air removing properties and preventing vulcanization defects. Note that "rubber hardness" in the present technology is the hardness (JIS-A hardness) measured in accordance with JIS (Japanese Industrial Standard) K6253 using a type A durometer at a temperature of 20° C.

In the present technology, preferably a thickness of the partial tie rubber layer is from 0.1 mm to 1.0 mm. Setting the thickness of the partial tie rubber layer in this manner allows the shape of the partial tie rubber layer to be favorably maintained, which is advantageous in enhancing the air removing properties and preventing vulcanization defects.

In the present technology, preferably, a projection amount L1 from a perpendicular line P drawn from an outermost end portion in the tire lateral direction of the belt layer toward the innerliner layer toward the bead portion side of the partial tie rubber layer is 15 mm or greater. By setting the length of the partial tie rubber layer to the appropriate range and optimizing it, it is possible to achieve a balance between reduction of tire weight and rolling resistance and prevention of vulcanization defects to a high degree.

DETAILED DESCRIPTION

Configurations of embodiments of the present technology are described in detail below with reference to the accompanying drawings.

Figure 1:
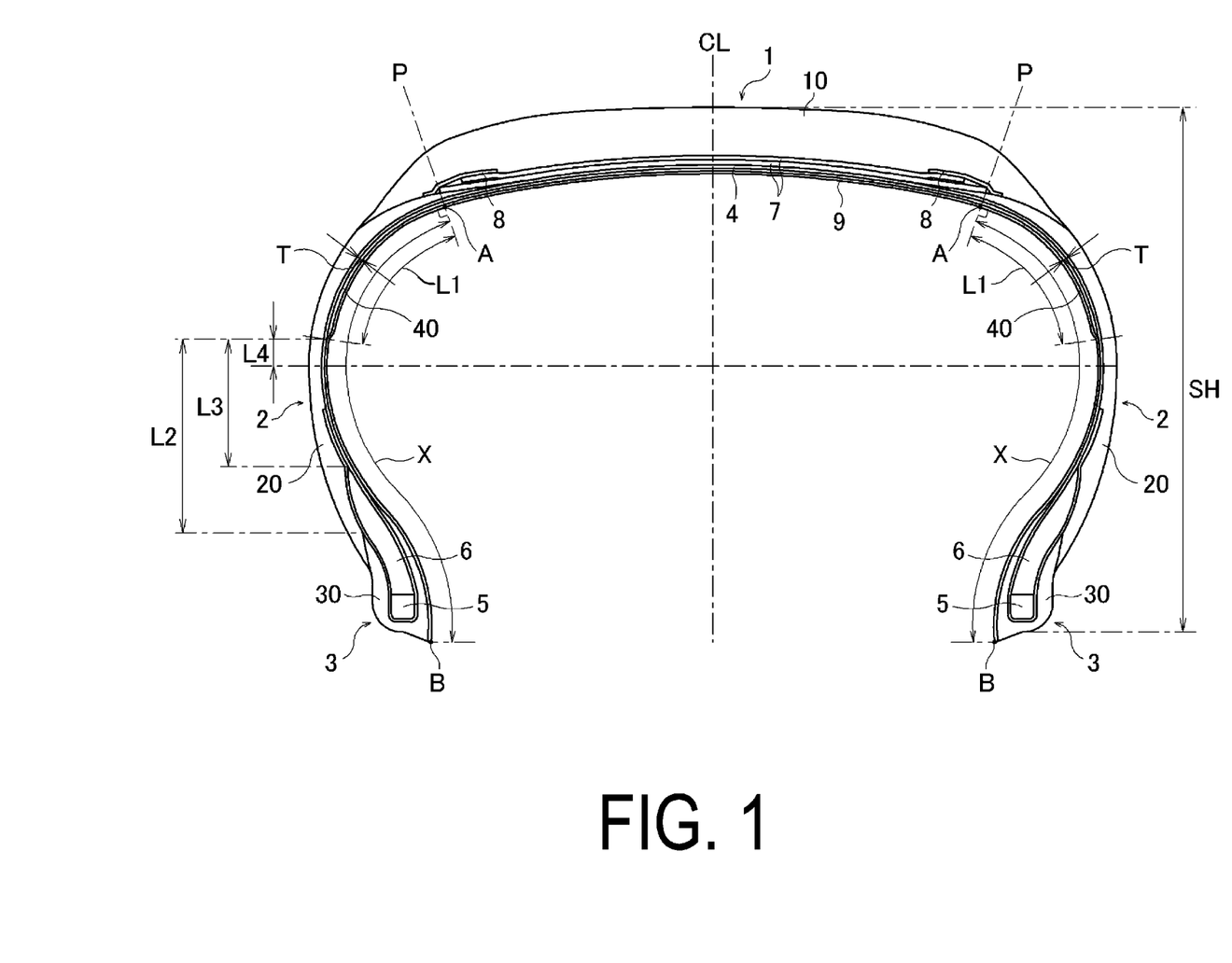
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. Also, in the tread portion 1, a plurality of belt layers 7 (two layers in FIGS. 1 to 3) are embedded on the outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. Moreover, a belt reinforcing layer 8 (in the illustrated example, a pair of the belt reinforcing layers 8 covering end portions of the belt layer 7) are provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°. An innerliner layer 9 is disposed on the tire inner surface. The innerliner layer 9 is made of a rubber composition containing a butyl rubber with air permeation preventive performance and prevents air inside the tire from permeating to the outside of the tire.

A tread rubber layer 10 is disposed on the outer circumferential side of the carcass layer 4 in the tread portion 1. A side rubber layer 20 is disposed on the outer circumferential side (outward in the tire lateral direction) of the carcass layer 4 in each of the sidewall portions 2. A rim cushion rubber layer 30 is disposed on the outer circumferential side (outward in the tire lateral direction) of the carcass layer 4 in each of the bead portions 3. The tread rubber layer 10 may have a multilayer structure including two types of rubber layers (cap tread rubber layer, undertread rubber layer) with differing physical properties layered in the tire radial direction.

A partial tie rubber layer 40 is disposed between the innerliner layer 9 and the carcass layer 4. The tie rubber layer 40 disposed between the innerliner layer 9 and the carcass layer 4 is a layer for preventing the carcass cords from digging into the innerliner layer 9 when the unvulcanized pneumatic tire is inflated during the tire manufacturing process. The tie rubber layer 40 contributes to the air permeation preventive properties and steering stability on dry road surfaces of the manufactured tire. Conventionally, a tie rubber layer (full tie rubber layer) has been disposed covering the entire region between the carcass layer 4 and the innerliner layer 9. However, the partial tie rubber layer 40 according to an embodiment of the present technology is disposed in a limited manner across the entire region except at the ends near the bead portions 3. Specifically, the partial tie rubber layer 40 is disposed across the entire region except a region (end near the bead portions 3) beyond where the distance along the tire inner surface from an intersection point A is 0.80X, where X is a periphery length along the tire inner surface from the intersection point A to an end point B of a bead toe, and the intersection point A is between a perpendicular line P drawn from the outermost end portion in the tire lateral direction of the belt layer 7 toward the innerliner layer 9 and the tire inner surface.

Figure 2:
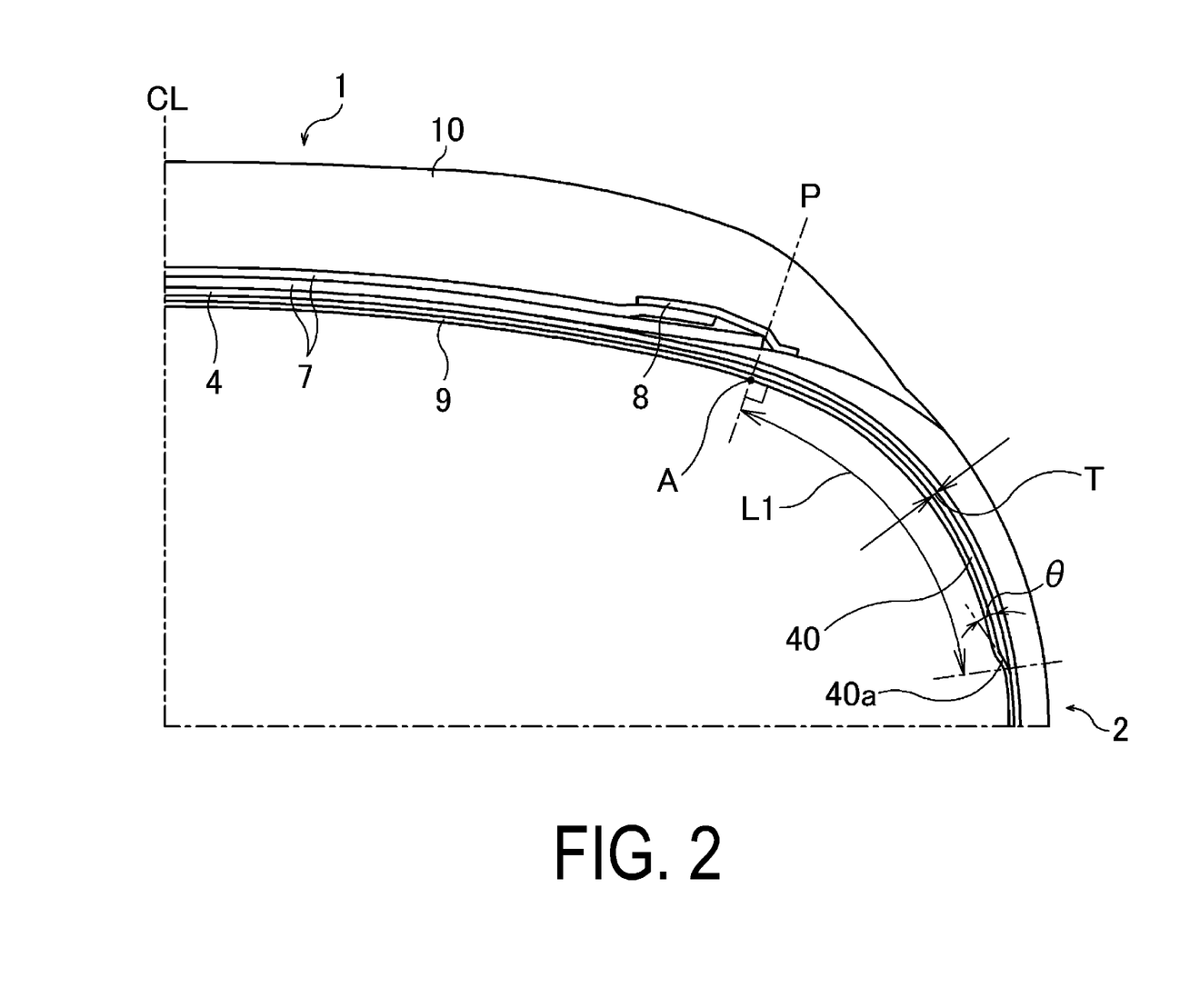
FIG. 2 is a meridian cross-sectional view illustrating an enlarged main portion of the pneumatic tire of FIG. 1.

As illustrated in enlarged detail in FIG. 2, an end surface 40a of the partial tie rubber layer 40 is an inclined surface that forms an acute angle with respect to the surface of the partial tie rubber layer 40 on the carcass layer 4 side. An inclination angle θ of the inclined surface of the partial tie rubber layer 40 on the carcass layer 4 side is from 20° to 60°.

Figure 3A:
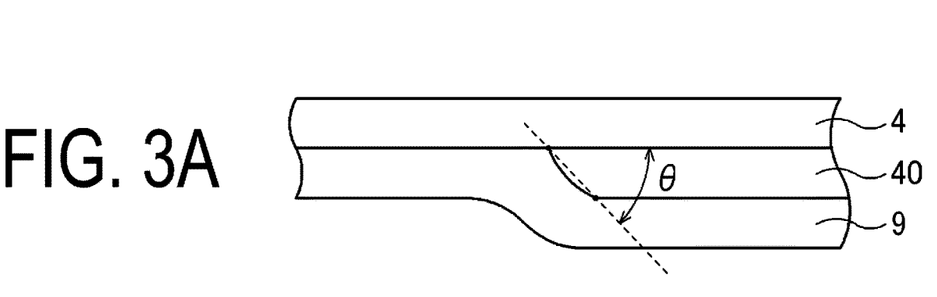
FIGS. 3A and 3B are cross-sectional views of a main portion for describing a method of measuring an inclination angle θ.
Figure 3B:
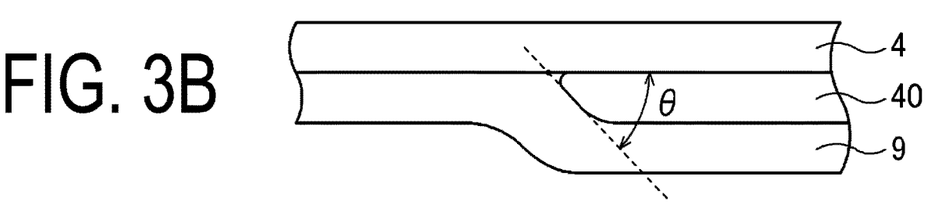

Note that in the present technology, the inclination angle θ is measured as illustrated in FIGS. 3A and 3B. Specifically, as illustrated in FIG. 3A, in a meridian cross-section view, in the case in which the edge of the inclined surface and the surface of the partial tie rubber layer 40 on the carcass layer 4 side and the edge of the inclined surface and the surface of the partial tie rubber layer 40 on the innerliner layer 9 side are evident, the angle formed by the line joining these edges and the surface of the partial tie rubber layer 40 on the carcass layer 4 side is taken as the inclination angle θ. As illustrated in FIG. 3B, in a meridian cross-section view, in the case in which the edge of the inclined surface and the surface of the partial tie rubber layer 40 on the carcass layer 4 side is not evident, the angle formed by an imaginary line extending from a linearly extending portion of the inclined surface and an extension line of the surface of the partial tie rubber layer 40 on the carcass layer 4 side is taken as the inclination angle θ.

In this manner, both end surfaces 40a of the partial tie rubber layer 40 are formed with an inclined surface having a specific angle. This can suppress the formation of a potential air-pocket-causing level difference or a gap between the innerliner layer 9 and the carcass layer 4 and the end surface 40a of the partial tie rubber layer 40 when the tire components are layered in the tire manufacturing process. Thus, vulcanization defects can be prevented. By preventing vulcanization defects by specifying the structure of the end portions in this manner, the effect from employing the partial tie rubber layer 40 can be retained. That is, tire weight can be reduced and rolling resistance can be reduced compared to conventional pneumatic tires with a full tie rubber layer.

In the case in which the inclination direction of the inclined surface is reversed (the inclined surface forms an acute angle with respect to the surface on the innerliner layer 9 side), the structure of the end portions of the partial tie rubber layer 40 is not appropriate for sufficiently increasing the air removing properties. When the inclination angle θ is less than 20°, the end of the partial tie rubber layer 40 is too thin, and the tie rubber layer may be inhibited from functioning as a tie rubber layer. When the inclination angle θ is greater than 60°, the inclination is insufficient for sufficiently obtaining an effect from the inclined surface. Note that the inclination angle θ is preferably from 35° to 55°.

Figure 4A:
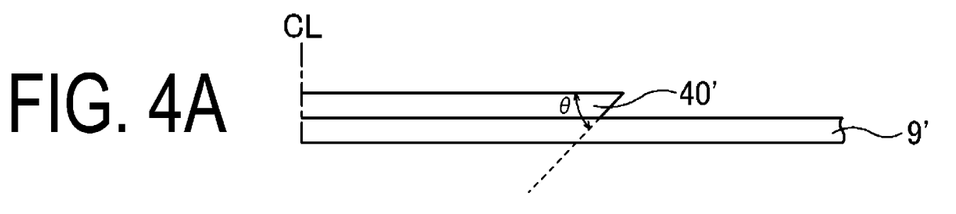
FIGS. 4A to 4B are schematic diagrams for describing a method of manufacturing a pneumatic tire according to an embodiment of the present technology.
Figure 4B:
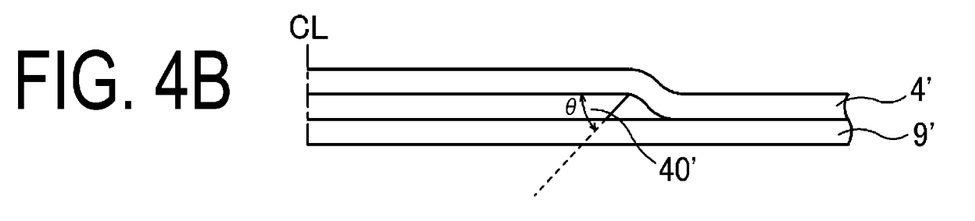

A pneumatic tire including the partial tie rubber layer 40 having such a shape is manufactured as follows, for example. First, as illustrated in FIG. 4A, the unvulcanized partial tie rubber layer 40' is placed on the unvulcanized innerliner layer 9' in a limited manner across the entire region corresponding to the entire region excluding the end portions near the pair of bead portions 3 of the pneumatic tire after vulcanization. Next, as illustrated in FIG. 4B, the unvulcanized carcass layer 4' is layered on the unvulcanized innerliner layer 9' with the unvulcanized partial tie rubber layer 40' therebetween. Then, other tire components are layered and a green tire is formed. Then, the green tire is vulcanized with a bladder pressing against the inner side, and a pneumatic tire is produced. Here, as illustrated in the drawings, both lateral end portions of the unvulcanized partial tie rubber layer 40' are inclined surfaces that form an acute angle with respect to a first surface of the unvulcanized partial tie rubber layer 40'. The inclination angle θ' of the inclined surface with respect to the first surface is set to a range from 20° to 60°. Additionally, as illustrated in the drawings, when the unvulcanized partial tie rubber layer 40' is layered on the unvulcanized innerliner layer 9', the unvulcanized partial tie rubber layer 40' is layered on the innerliner layer 9' orientated such that the first surface is on the unvulcanized carcass layer 4' side.

In this way, as illustrated in FIG. 4B, in a state where these tire components are simply layered on one another, a gap is formed between the innerliner layer 9', the carcass layer 4', and the end of the partial tie rubber layer 40'. However, in the vulcanization process, the bladder presses against the innerliner layer 9', which is more malleable than the carcass layer 4' embedded with the reinforcing cords (carcass cords), and the innerliner layer 9' deforms to conform to the inclined surface of the partial tie rubber layer 40'. Then, the air on the gap illustrated in FIG. 4B is pushed out, and no gaps remain in the vulcanized tire as illustrated in FIG. 2, for example. Air is favorably removed so that air pockets are not formed. In this way, vulcanization defects can be effectively prevented.

Note that in the example of FIGS. 4A and 4B, the unvulcanized partial tie rubber layer 40' is placed on the unvulcanized innerliner layer 9', and the other tire components (the unvulcanized carcass layer 4' and the like) are sequentially layered. In the present technology, it is sufficient that both lateral end portions of the unvulcanized partial tie rubber layer 40' are inclined surfaces that form an acute angle with respect to the first surface of the unvulcanized partial tie rubber layer 40' when the unvulcanized innerliner layer 9', the unvulcanized partial tie rubber layer 40', and the unvulcanized carcass layer 4' are layered on one another. Thus, the unvulcanized partial tie rubber layer 40' may be placed on the unvulcanized carcass layer 4'.

The unvulcanized partial tie rubber layer 40' used in the manufacturing method described above is different only in that the shape of the end portion is narrower in width compared to the unvulcanized tie rubber layer used in the method of manufacturing a pneumatic tire including a conventional full tie rubber layer. Thus, the manufacturing method described above is advantageous in that it can be employed without a major change to conventional manufacturing equipment.

The physical properties of the rubber composition constituting the partial tie rubber layer 40 are not particularly limited, but the rubber hardness is preferably from 50 to 70, and more preferably from 55 to 65. Setting the hardness of the partial tie rubber layer 40 in this manner allows the shape of the partial tie rubber layer 40 to be favorably maintained, which is advantageous in enhancing the air removing properties and preventing vulcanization defects. Here, when the rubber hardness is less than 50, the rigidity of the partial tie rubber layer 40 is significantly low. This makes it difficult for the partial tie rubber layer 40 to maintain its shape and air removing properties are decreased, making it difficult to prevent vulcanization defects. When the hardness of the partial tie rubber layer 40 is greater than 70, the rigidity of the sidewall portion 2 is too high, and thus the inherent performance of the pneumatic tire may be adversely affected.

The partial tie rubber layer 40 should have a thickness sufficient to sufficiently function as the tie rubber layer (preventing the carcass cords from digging into the innerliner layer 9 during the tire manufacturing process), but on the other hand, preferably, the used amount is suppressed to reduce tire weight. Also, the partial tie rubber layer 40 should have a thickness suitable to maintaining the shape of the partial tie rubber layer 40 and allowing good air removal. Thus, in an embodiment of the present technology, a thickness T of the partial tie rubber layer 40 is preferably set within a range from 0.1 mm to 1.0 mm, and more preferably within a range from 0.3 mm to 0.7 mm. In this way, sufficient functioning as a tie rubber layer can be achieved and the effect of reducing tire weight can be sufficiently exhibited. This also helps with vulcanization defects. Here, when the thickness T of the partial tie rubber layer 40 is less than 0.1 mm, the partial tie rubber layer 40 is too thin, so the partial tie rubber layer 40 cannot function sufficiently as the tie rubber layer, and the effect of preventing the carcass cords digging into the innerliner layer 9 during the tire manufacturing process is limited. Also, this makes it difficult for the partial tie rubber layer 40 to maintain its shape and air removing properties are decreased, making it difficult to sufficiently prevent vulcanization defects. When the thickness T of the partial tie rubber layer 40 is greater than 1.0 mm, the partial tie rubber layer 40 is too thick and the used amount increases, so the effect of reducing the tire weight is limited.

The partial tie rubber layer 40 of an embodiment of the present technology is provided in a limited manner across the entire region excluding the ends near the bead portions 3 as described above. From the perspective of maintaining air permeation preventive properties and steering stability, the partial tie rubber layer 40 preferably projects sufficiently from the perpendicular line P described above toward the bead portion 3. That is, a projection amount L1 of the partial tie rubber layer 40 from the perpendicular line P toward the bead portion 3 is preferably from 0.25 times to 0.80 times the periphery length X described above, and more preferably from 0.30 times to 0.70 times the periphery length X described above. When the projection amount L1 is less than 0.25 times the periphery length X, the partial tie rubber layer 40 cannot cover a sufficient region, making it difficult to favorably maintain air permeation preventive properties and steering stability. When the projection amount L1 is greater than 0.80 times the periphery length X, the protrusion amount L1 is substantially equivalent to the full tie rubber layer, and the effect of reducing the tire weight cannot be sufficiently obtained.

The projection amount L1 of the partial tie rubber layer 40 preferably satisfies the range described above and is preferably 15 mm or greater. As a result of diligent research on the arrangement of the partial tie rubber layer 40 in the case in which a partial tie rubber layer 40 is employed, the present inventors discovered that, to obtain air permeation preventive properties and steering stability equivalent to those of a pneumatic tire including a conventional full tie rubber layer, the partial tie rubber layer 40 preferably covers at least a specific region near the outermost end portion in the tire lateral direction of the belt layer 7 (the region between the perpendicular line P and a position 15 mm from the perpendicular line P toward the bead portion 3 along the partial tie rubber layer 40). By the projection amount L1 being 15 mm or greater as described above, this region can be definitely covered by the partial tie rubber layer 40, which is advantageous in maintaining the air permeation preventive properties and the steering stability to a high degree. When the projection amount L1 is less than 15 mm, the region described above cannot be covered, making it difficult to favorably maintain air permeation preventive properties and steering stability.

In an embodiment of the present technology, the partial tie rubber layer 40 is disposed at the position described above. Also, the position of the end portion is preferably set as follows. Specifically, the end portion of the partial tie rubber layer 40 is preferably located further outward in the tire radial direction than the radially outer end portion of the rim cushion rubber layer 30, and a separation distance L2 between the end portion of the partial tie rubber layer 40 and the radially outer end portion of the rim cushion rubber layer 30 is preferably not less than 0.50 times a tire cross-sectional height SH. Additionally, the end portion of the partial tie rubber layer 40 is preferably located further outward in the tire radial direction than the radially outer end portion of the bead filler 6, and a separation distance L3 between the end portion of the partial tie rubber layer 40 and the radially outer end portion of the bead filler 6 is preferably not less than 0.40 times the tire cross-sectional height SH. In this way, the positional relationship between the partial tie rubber layer 40 and the other tire components (the rim cushion rubber layer 30 and the bead filler 6) is optimized, and a moderate distance can be maintained between the partial tie rubber layer 40 and the other rigid member tire components (the rim cushion rubber layer 30 and the bead filler 6). This is advantageous in maintaining steering stability in particular.

Furthermore, the end portion of the partial tie rubber layer 40 is preferably located further outward in the tire radial direction than the tire maximum width position, and a separation distance L4 between the end portion of the partial tie rubber layer 40 and the tire maximum width position is preferably not less than 0.05 times the tire cross-sectional height SH. By configuring the partial tie rubber layer 40 to not overlap with the tire maximum width position, the effect of reducing the tire weight can be further improved.

EXAMPLES

Tires according to Conventional Example 1, Comparative Examples 1 to 4, and Examples 1 to 19 (24 types of pneumatic tires) were manufactured. The tires have a tire size of 195/65R15 and have the basic structure illustrated in FIG. 1. The tires are set for tie rubber layer structure, inclination angle θ of inclined surface formed on end portion of partial tie rubber layer, rubber hardness of partial tie rubber layer, rubber thickness of partial tie rubber layer, and projection amount L1 from perpendicular line P of partial tie rubber layer as indicated in Tables 1 and 2.

Note that, for "tie rubber layer structure" in Tables 1 and 2, "full" indicates that the tie rubber layer is a full tie rubber layer, and "partial" indicates that the tie rubber layer is a partial tie rubber layer.

These 24 types of pneumatic tires were evaluated for used amount of tie rubber, rolling resistance, and defect rate by the evaluation methods described below, and the results are shown in Tables 1 and 2.

Used Amount of Tie Rubber

The amount of tie rubber used in each test tire was measured. Evaluation results are expressed as index values with the measurement value of Conventional Example 1 being assigned the index value of 100. Smaller index values indicate a lower used amount of tie rubber and that a reduction in tire weight can be obtained. Note that when the index value is "80" or less, the used amount of tie rubber is sufficiently low, and an excellent tire weight reduction effect is obtained. Conversely, when the index value is greater than "80", the used amount of tie rubber is not sufficiently low, and the effect of reducing the tire weight is not substantially obtained. In particular, when the index value is "50" or less, an excellent, large effect of reducing the tire weight is obtained.

Rolling Resistance

The test tires were mounted on wheels having a rim size of 15×6J and mounted on a drum testing machine with a drum diameter of 1707.6 mm in accordance with ISO (International Organization for Standardization) 28580. Rolling resistance was measured under the following conditions: air pressure=210 kPa, load=4.82 kN, speed=80 km/h. Evaluation results are expressed as index values with the reciprocal of the measurement value of Conventional Example 1 being assigned the index value of 100. Larger index values indicate lower rolling resistance.

Defect Rate 100 tires of each test tire were manufactured, the inner surface of each molded or vulcanized tire was visually inspected for the presence of an inner surface defect that occurred in the molding or vulcanization step, and the defect rate (the proportion of the number of tires in which an inner surface defect occurred with respect to the total number of the test tire) was measured. Evaluation results are expressed as index values with the reciprocal of the measurement value of Conventional Example 1 being assigned the index value of 100. Larger index values indicate a lower inner surface defect rate.

TABLE 1

|  |  | Conventional Example 1 | Comparative Example 1 | Comparative Example 2 | Example 1 | Comparative Example 3 |
|---|---|---|---|---|---|---|
| Tie rubber layer structure |  | Full | Partial | Partial | Partial | Partial |
| Inclination angle θ | ° | — | 90 | 135 | 45 | 10 |
| Rubber hardness |  | 60 | 60 | 60 | 60 | 60 |
| Rubber thickness T | mm | 0.5 | 0.5 | 0.5 | 0.5 | 0.5 |
| Projection amount L1 | mm |  | 40 | 40 | 40 | 40 |
| Used amount of tie rubber | Index value | 100 | 55 | 55 | 55 | 55 |
| Rolling resistance | Index value | 100 | 104 | 104 | 104 | 104 |
| Defect rate | Index value | 100 | 70 | 80 | 94 | 89 |

|  |  | Example 2 | Example 3 | Example 4 | Example 5 | Comparative Example 4 | Example 6 | Example 7 |
|---|---|---|---|---|---|---|---|---|
| Tie rubber layer structure |  | Partial | Partial | Partial | Partial | Partial | Partial | Partial |
| Inclination angle θ | ° | 20 | 35 | 55 | 60 | 70 | 45 | 45 |
| Rubber hardness |  | 60 | 60 | 60 | 60 | 60 | 45 | 50 |
| Rubber thickness T | mm | 0.5 | 0.5 | 0.5 | 0.5 | 0.5 | 0.5 | 0.5 |
| Projection amount L1 | mm | 40 | 40 | 40 | 40 | 40 | 40 | 40 |
| Used amount of tie rubber | Index value | 55 | 55 | 55 | 55 | 55 | 55 | 55 |
| Rolling resistance | Index value | 104 | 104 | 104 | 104 | 104 | 104 | 104 |
| Defect rate | Index value | 91 | 93 | 93 | 91 | 89 | 92 | 93 |

TABLE 2

|  |  | Example 8 | Example 9 | Example 10 | Example 11 | Example 12 | Example 13 |
|---|---|---|---|---|---|---|---|
| Tie rubber layer structure |  | Partial | Partial | Partial | Partial | Partial | Partial |
| Inclination angle θ | ° | 45 | 45 | 45 | 45 | 45 | 45 |
| Rubber hardness |  | 70 | 75 | 60 | 60 | 60 | 60 |
| Rubber thickness T | mm | 0.5 | 0.5 | 0.1 | 0.3 | 0.7 | 1.0 |
| Projection amount L1 | mm | 40 | 40 | 40 | 40 | 40 | 40 |
| Used amount of tie rubber | Index value | 55 | 55 | 53 | 54 | 56 | 57 |
| Rolling resistance | Index value | 103 | 102 | 104 | 104 | 104 | 103 |
| Defect rate | Index value | 94 | 94 | 92 | 93 | 94 | 93 |

|  |  | Example 14 | Example 15 | Example 16 | Example 17 | Example 18 | Example 19 |
|---|---|---|---|---|---|---|---|
| Tie rubber layer structure |  | Partial | Partial | Partial | Partial | Partial | Partial |
| Inclination angle θ | ° | 45 | 45 | 45 | 45 | 45 | 45 |

TABLE 2-continued

| | | | | | | | |
|---|---|---|---|---|---|---|---|
| Rubber hardness | | 60 | 60 | 60 | 60 | 60 | 60 |
| Rubber thickness T | mm | 1.2 | 0.5 | 0.5 | 0.5 | 0.5 | 0.5 |
| Projection amount L1 | mm | 40 | 10 | 15 | 30 | 60 | 65 |
| Used amount of tie rubber | Index value | 58 | 49 | 50 | 52 | 58 | 60 |
| Rolling resistance | Index value | 102 | 105 | 105 | 104 | 102 | 101 |
| Defect rate | Index value | 92 | 94 | 94 | 94 | 94 | 94 |

As can be seen from Tables 1 to 2, compared to Conventional Example 1, Examples 1 to 19 have a reduced used amount of tie rubber, reduced rolling resistance, and lower defect rate.

Looking at Comparative Example 1, the inclination angle θ is 90° and the end portions of the partial tie rubber layer are not inclined, thus air removing properties via an inclined surface could not be obtained and the defect rate was worse. Looking at Comparative Example 2, the inclination angle θ is 135° and the orientation of the partial tie rubber layer is opposite from that of the structure according to an embodiment of the present technology, thus air removing properties via an inclined surface could not be obtained and the defect rate was worse. Looking at Comparative Example 3, the inclination angle θ is too small, thus the defect rate could not be sufficiently maintained. Looking at Comparative Example 4, the inclination angle θ is too large, thus the defect rate could not be enhanced in a manner substantially equivalent to Comparative Example 1.

The invention claimed is:

1. A pneumatic tire, comprising:
an annular tread portion extending in a tire circumferential direction;
a pair of sidewall portions disposed on both sides of the tread portion;
a pair of bead portions disposed inward of the pair of sidewall portions in a tire radial direction;
a carcass layer mounted between the pair of bead portions;
a belt layer disposed radially outward of the carcass layer in the tread portion;
an innerliner layer disposed on a tire inner surface along the carcass layer; and
a partial tie rubber layer disposed between the carcass layer and the innerliner layer, in contact with the innerliner layer, across an entire region between the pair of sidewall portions and excluding end portions near the pair of bead portions; wherein
a hardness of a rubber constituting the partial tie rubber layer is from 50 to 70;
end surfaces of the partial tie rubber layer on both sides in a tire lateral direction are inclined surfaces that form an acute angle with respect to a surface of the partial tie rubber layer on a carcass layer side;
an inclination angle of the inclined surfaces with respect to the surface of the partial tie rubber layer on the carcass layer side is from 20° to 60°;
a radially innermost end of the partial tie rubber layer terminates radially outward of a tire maximum width position, a separation distance between the radially innermost end of the partial tie rubber layer and the tire maximum width position being not less than 0.05 times a tire cross-sectional height of the pneumatic tire; and
a projection amount L1 from a perpendicular line P drawn from an outermost end portion in the tire lateral direction of the belt layer toward the innerliner layer toward a bead portion side of the partial tie rubber layer is from 15 mm to 18 mm.

2. The pneumatic tire according to claim 1, wherein a thickness of the partial tie rubber layer is from 0.1 mm to 1.0 mm.

3. A method of manufacturing a pneumatic tire, comprising:
placing an unvulcanized partial tie rubber layer across an entire region between a pair of sidewall portions of an unvulcanized innerliner layer or a carcass layer corresponding to a region of a vulcanized pneumatic tire excluding end portions near a pair of bead portions;
layering the unvulcanized carcass layer on the unvulcanized innerliner layer with the unvulcanized partial tie rubber layer therebetween, the unvulcanized partial tie rubber layer being in contact with the innerliner layer, and forming a green tire; and
vulcanizing the green tire with a bladder pressing against an inner side of the green tire; wherein
an inclined surface that forms an acute angle with respect to a first surface of the unvulcanized partial tie rubber layer is formed on each lateral end portion of the unvulcanized partial tie rubber layer;
an inclination angle of the inclined surface with respect to the first surface is from 20° to 60°;
a radially innermost end of the partial tie rubber layer terminates radially outward of a tire maximum width position, a separation distance between the radially innermost end of the partial tie rubber layer and the tire maximum width position being not less than 0.05 times a tire cross-sectional height of the pneumatic tire;
the unvulcanized partial tie rubber layer is layered between the unvulcanized innerliner layer and the unvulcanized carcass layer with the first surface orientated facing the unvulcanized carcass layer;
a projection amount L1 from a perpendicular line P drawn from an outermost end portion in a tire lateral direction of a belt layer disposed radially outward of the unvulcanized carcass layer in a tread portion toward the unvulcanized innerliner layer toward a bead portion side of the unvulcanized partial tie rubber layer is from 15 mm to 18 mm.

4. A pneumatic tire, comprising:
an annular tread portion extending in a tire circumferential direction;
a pair of sidewall portions disposed on both sides of the tread portion;
a pair of bead portions disposed inward of the pair of sidewall portions in a tire radial direction;

a carcass layer mounted between the pair of bead portions;

a belt layer disposed radially outward of the carcass layer in the tread portion;

an innerliner layer disposed on a tire inner surface along the carcass layer; and a partial tie rubber layer disposed between the carcass layer and the innerliner layer, in contact with the innerliner layer, across an entire region between the pair of sidewall portions and excluding end portions near the pair of bead portions; wherein end surfaces of the partial tie rubber layer on both sides in a tire lateral direction are inclined surfaces that form an acute angle with respect to a surface of the partial tie rubber layer on a carcass layer side;

an inclination angle of the inclined surfaces with respect to the surface of the partial tie rubber layer on the carcass layer side is from 20° to 60°;

a radially innermost end of the partial tie rubber layer terminates radially outward of a tire maximum width position, a separation distance between the radially innermost end of the partial tie rubber layer and the tire maximum width position being not less than 0.05 times a tire cross-sectional height of the pneumatic tire; and a projection amount L1 from a perpendicular line P drawn from an outermost end portion in the tire lateral direction of the belt layer toward the innerliner layer toward a bead portion side of the partial tie rubber layer is from 15 mm to 18 mm.

* * * * *